US005364120A

United States Patent [19]

Shimansky

[11] Patent Number: 5,364,120

[45] Date of Patent: Nov. 15, 1994

[54] MOBILITY AID FOR PHYSICALLY DISABLED PEOPLE

[76] Inventor: David Shimansky, 5622 McAlear Ave., Côte St. Luc, Quebec, Canada, H4W 2G7

[21] Appl. No.: 50,771

[22] Filed: Apr. 22, 1993

[51] Int. Cl.[5] .......... B62B 7/06

[52] U.S. Cl. .......... 280/650; 280/87.041; 280/47.2; 280/47.25; 297/5

[58] Field of Search .......... 280/1.175, 1.181, 1.191, 280/1.196, 642, 647, 650, 87.01, 87.021, 87.041, 87.05, 47.2, 47.24, 47.25, 47.38; 135/67; 297/5

[56] References Cited

U.S. PATENT DOCUMENTS

| | | | |
|---|---|---|---|
| 1,950,338 | 3/1934 | Zivkovic | 280/1.175 |
| 4,230,331 | 10/1980 | Johnson | 280/87.041 X |
| 4,552,372 | 11/1985 | Jones | 280/87.041 |
| 5,090,724 | 2/1992 | Fiore | 297/129 X |

OTHER PUBLICATIONS

"Why sit when you can Stand-N-Go", Stand-N-Go Inc.

"Affordable Alternatives for Dignity and Independence", Rifton.

"New Life Dimension with the Pro-Vertic 2000 self--rising wheelchair", Pro-Vertic 1987 Inc.

"Mobile Prone Standers", Rifton.

"Free Spirit TM folding rollator", AMG Homecare, a division of AMG Medical Inc.

*Primary Examiner*—Margaret A. Focarino
*Assistant Examiner*—Michael Mar
*Attorney, Agent, or Firm*—Swabey Ogilvy Renault

[57] ABSTRACT

A multifunctional mobility device for physically disabled people comprises a L-shaped frame having at its lower end a platform adapted to receive thereon a user in a substantially standing position. Front and rear wheels support the frame and the platform. The front wheels are rotatably mounted to the frame just in front of the platform. The frame includes at its upper end a pair of grips which can be grasped by the user when standing on the platform. Therefore, to operate the mobility device, the user must exert on the frame a sufficient force oriented substantially in a forward direction thereby producing a pivot of the frame and of the platform about the front wheel and a rotation of the front wheel which results in a forward displacement of the mobility device and of the user. A stabilizer terminated by a swivel caster is provided in front of the front wheels for limiting the forward pivot of the mobility device. A retractable seat also transforms the mobility aid into a wheelchair. The platform is then converted into a footrest. A second pair of grips is provided to be used by the attendant for pushing the user. The stabilizer can be retracted to allow the attendant to push the wheelchair on horizontal surfaces or along inclined surfaces, such as stairs or escalators. The mobility device is constructed of a number of connected members designed to fold for providing low profile mobility device for stowage and transportation purposes.

16 Claims, 4 Drawing Sheets

MOBILITY AID FOR PHYSICALLY DISABLED PEOPLE

BACKGROUND OF THE INVENTION

1. Field of the Invention

The present invention relates to a mobility aid for the physically disabled and, more particularly, to a multi-functional mobility device combining a walker and a wheelchair.

2. Description of the Prior Art

Prior art devices include well known conventional walkers and wheelchairs. Furthermore, other mobility devices have been developed that are of dual-purpose or multi-purpose construction, incorporating one or more various functions, such as those offered by walkers, wheelchairs, chairs, etc.

For instance, U.S. Pat. No. 5,060,967 issued to Hulterstrum on Oct. 29, 1991 discloses a collapsible mobility device which includes a base with a vertical support and a seat, the base being supported on casters. The vertical support is capable of being extended and retracted while the seat can be pivoted from a functional horizontal position to an upward storage position. With the various accessories provided on the mobility device disclosed in this Patent, the device is capable of being used as a stool, a swivel chair, a wheelchair, a luggage rack, a walker and a wheeled cane. Regarding the wheelchair and walker constructions, this mobility device resembles basically a standard wheelchair, whereas the walker is of the type that is mounted on wheels, wherein the user grasps the elevated handles thereof and pushes and follows the device which displaces on its wheels. The user thus displaces behind the walker in a walking motion which requires that the user lifts his feet to gradually advance.

In "Why sit when you can Stand-N-GO", Stand-N-Go Inc. discloses a mobility device wherein the user is in a standing position on a platform supported by wheels, the user being well secured to the device and being able to operate a steering wheel which drives by way of an endless vertically oriented chain, along the same principle as a bicycle, the rear wheels of the device. The device has the lower body support of a standing frame but operates and maneuvers like a wheelchair. The device is hand powered, whereby it does not necessitate any batteries or complex electronic circuitry which can run out of current or fail, respectively. A retractable work table is provided on the frame of the device. This mobility standing aid is further disclosed in U.S. Pat. No. 4,809,997 issued to Owens on Mar. 7, 1989.

In "Affordable alternatives for dignity and independence", Rifton discloses a gait trainer which includes a frame mounted on wheels and including means for securing the user in a standing position thereby allowing the user to move around by walking while being supported by the training device. The arm rests and the wheels can be reversed to create a posterior walker.

In "New Life Dimension with the Pro-Vertic "2000" self-rising Wheelchair", Pro-Vertic 1987 Inc. discloses a self-rising wheelchair designed for people having lower limb paralysis. The device resembles a wheelchair in that it includes small front wheels and large rear wheels, and a platform onto which the feet of the user can rest. However, the user's body is supported by a further platform which extends at a slight angle from the vertical. The device allows for the user to be in a substantially standing position thereby improving blood circulation and reducing pressure sores. A lifting mechanism is provided for allowing instant standing and seating with infinite intermediate positions.

Rifton's "Mobile Prone Standers" are pre-ambulatory standing devices which each include a platform which supports the user in standing position, the user being secured by way of straps to a vertical frame and being able to operate by hand a pair of large wheelchair-type front wheels with the frame including a pair of rear casters. A further caster provided in front of the large wheels and located at a distance from the floor adds stability to the device.

In "Free Spirit TM folding rollator", AMG Homecare, a division of AMG Medical Inc., discloses a folding rollator including a frame supported by four wheels and handles connected to the frame, the unit operating as a walker-type device mounted on wheels. Removable plastic tray and carry basket are adaptable to the frame of the unit.

SUMMARY OF THE INVENTION

It is therefore an aim of the present invention to provide an improved mobility aid for physically disabled people.

It is also an aim of the present invention to provide a walker, wherein the walker and the user supported thereby are displaced using the mass of the human body for propulsion.

In accordance with the present invention, there is provided a mobility device for physically disabled people, comprising a frame means including a support means adapted to receive thereon a user, said frame means extending substantially upwards from said support means, front wheel means supporting said frame means with said front wheel means being rotatably mounted thereto in front of the user when carried by said support means and facing towards said frame means, whereby, to operate said mobility device, a sufficient force is exerted by the user on said frame means substantially in a forward direction thereby producing a pivot of said frame means and thus of said support means about said front wheel means and a rotation of said front wheel means thus resulting in a forward displacement of said mobility device and of the user carried thereby, stabilizer means being provided for limiting the pivot of said mobility device.

BRIEF DESCRIPTION OF THE DRAWINGS

Having thus generally described the nature of the invention, reference will now be made to the accompanying drawings showing by way of illustration a preferred embodiment, and in which.

DESCRIPTION OF THE PREFERRED EMBODIMENTS

Figure 1:
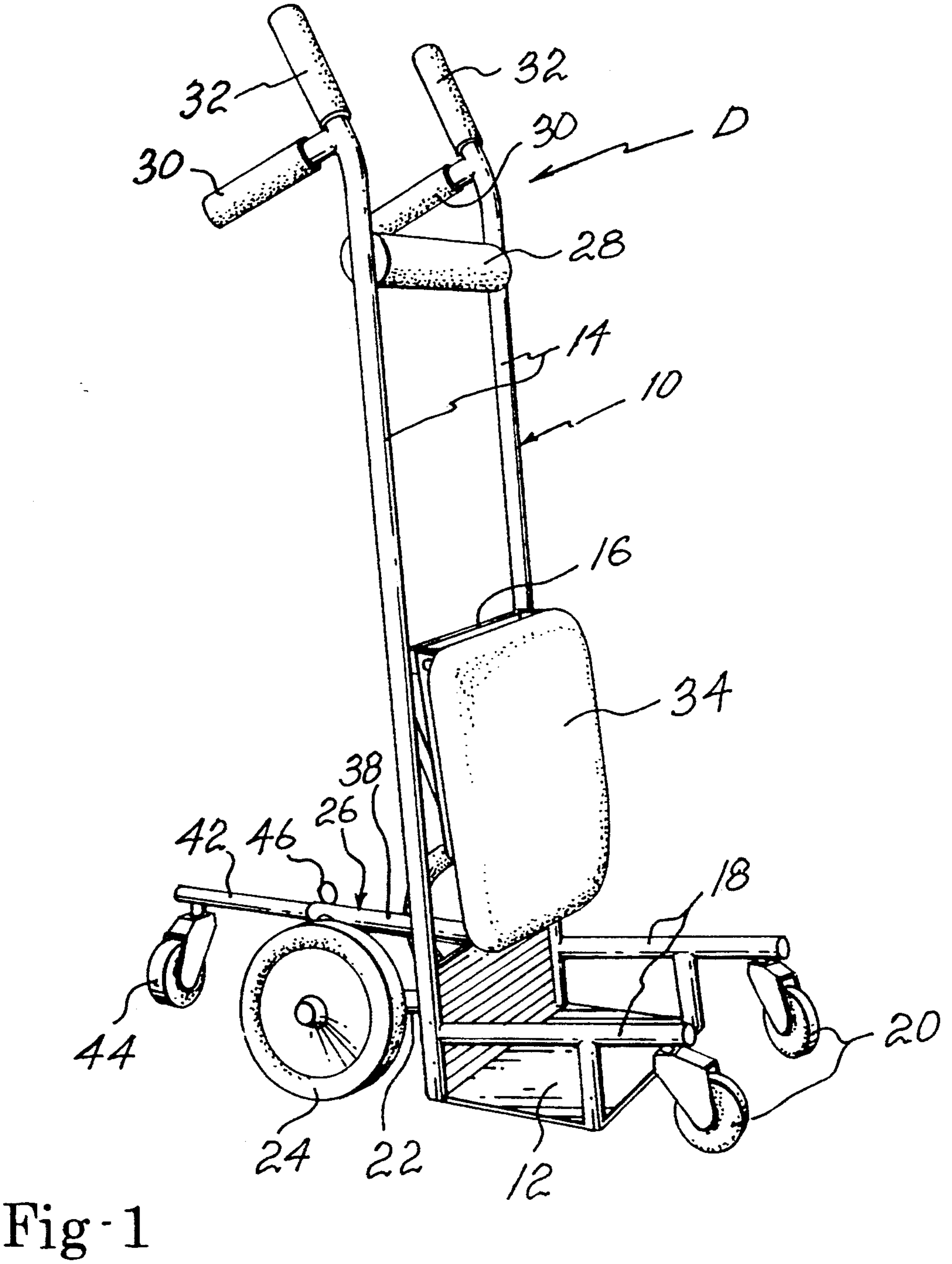
FIG. 1 is a perspective view of a mobility aid for physically disabled people in accordance with the present invention.
Figure 3:
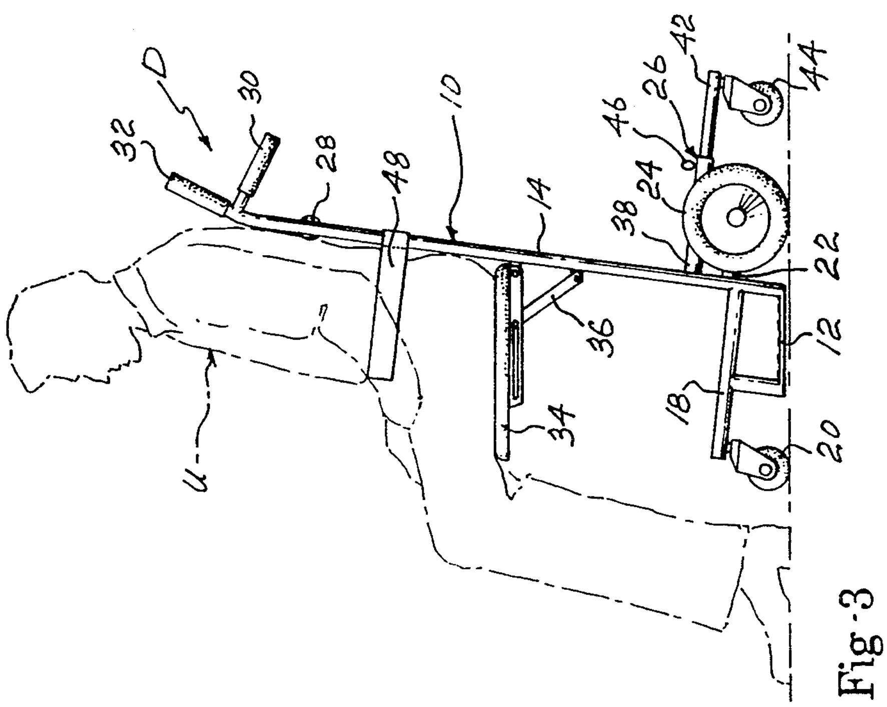
FIG. 3 is a side elevational view of the mobility aid of the present invention, shown in use as a wheelchair, with the user appearing in phantom lines.
Figure 6:
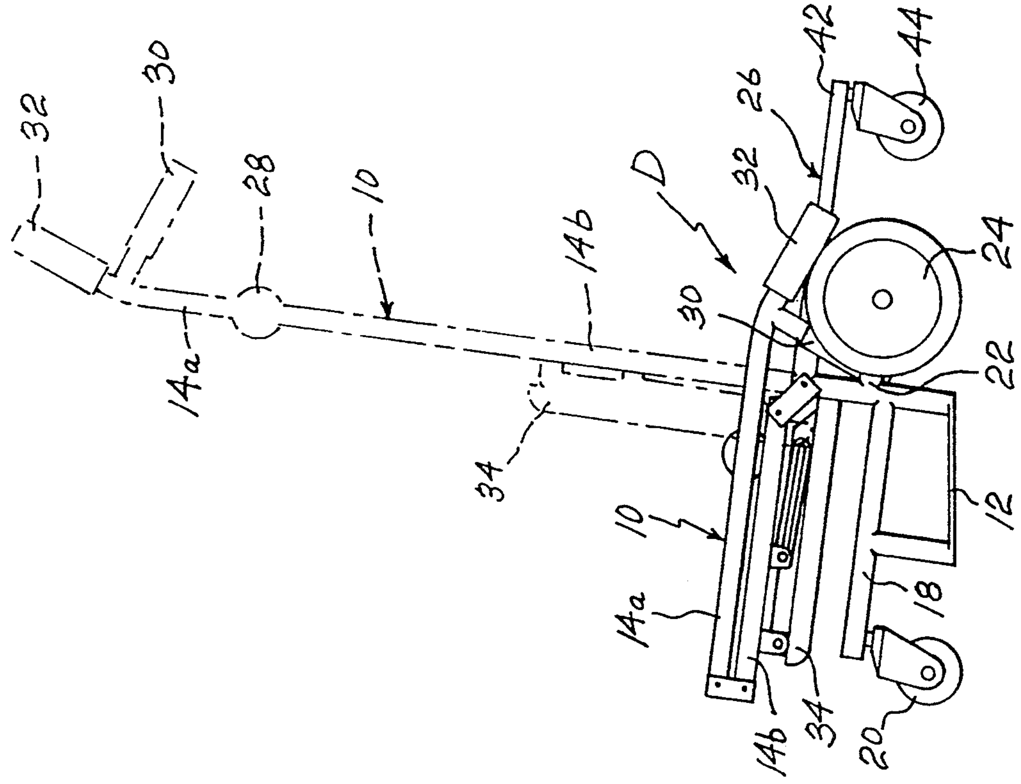
FIG. 6 is a side elevational view of the mobility aid in a collapsed storage position, with the mobility aid being shown in phantom lines in its extended functional position.

In accordance with the present invention, FIG. 1 illustrates a mobility aid or device D which can be used either as a walker (see FIG. 2) or as a wheelchair (see FIG. 3). FIG. 6 shows the mobility device D in a collapsed position thereof for storage purposes.

The present mobility device D represents a mobility aid for physically disabled people which fills a need not currently satisfied. Indeed, the mobility device D bridges the gap between a walker and a wheelchair. In fact, the mobility device D can perform as either one of these two devices. However, it possesses some unique properties and the most original idea behind the mobility device D lies in that the mass of the human body plays the major role in the propulsion of the present mobility aid. The basic laws of nature are put into practice in the present mobility device D. However, before explaining the operation of the mobility device D, a detailed description of the structure thereof follows hereinbelow.

The mobility device D comprises a frame 10 including a L-shaped platform 12 for supporting a user U; a pair of parallel substantially vertical struts or members 14 welded at their respective lower ends to the L-shaped platform 12; a horizontal seat support 16 which provides a reinforcement link between the two vertical members 14 near their middle sections; a pair of rear casters carrying members 18 extending from respective lower ends the vertical members 14 and welded thereto as well as to the platform 12, each carrying member 18 being provided at a respective free rear end thereof with a rear caster 20; a pair of front arms 22 extending forwardly from the lower ends of the vertical members 14 and each being provided with a wheel 24 rotatably mounted thereto; a front stabilizing member 26 extending forward from the platform 12 and the front ends of the front arms 22; and an upper reinforcing transversal padded member 28 extending between the vertical members 14 near the upper ends thereof. The upper ends of the vertical members 14 form two sets of handle bars or grips, that is a first set of grips 30 for use by an attendant when the mobility device D is in its wheelchair state shown in FIG. 3, and a second set of grips 32 adapted to be grasped by the user U when the mobility device D is in its walker configuration shown in FIG. 2 for assisting the user U in forwardly propelling the mobility device D and the user U. It is also contemplated to provide a dual-purpose set of grips which can be operated either by the user for the walker or by the attendant for the wheelchair.

A padded seat 34 hingedly mounted to the seat support 16 is made retractable by way of support brackets 36. Accordingly, when the present mobility device D is used as a walker, the user U stands on the platform 12 and grasps the second set of grips 32 with the padded seat 34 being in its collapsed storage position shown in FIGS. 1 and 2. If the mobility device D is used as a wheelchair, the padded seat 34 is extended as seen in FIG. 3 for receiving thereon the user U in a sitting position.

Figure 7:
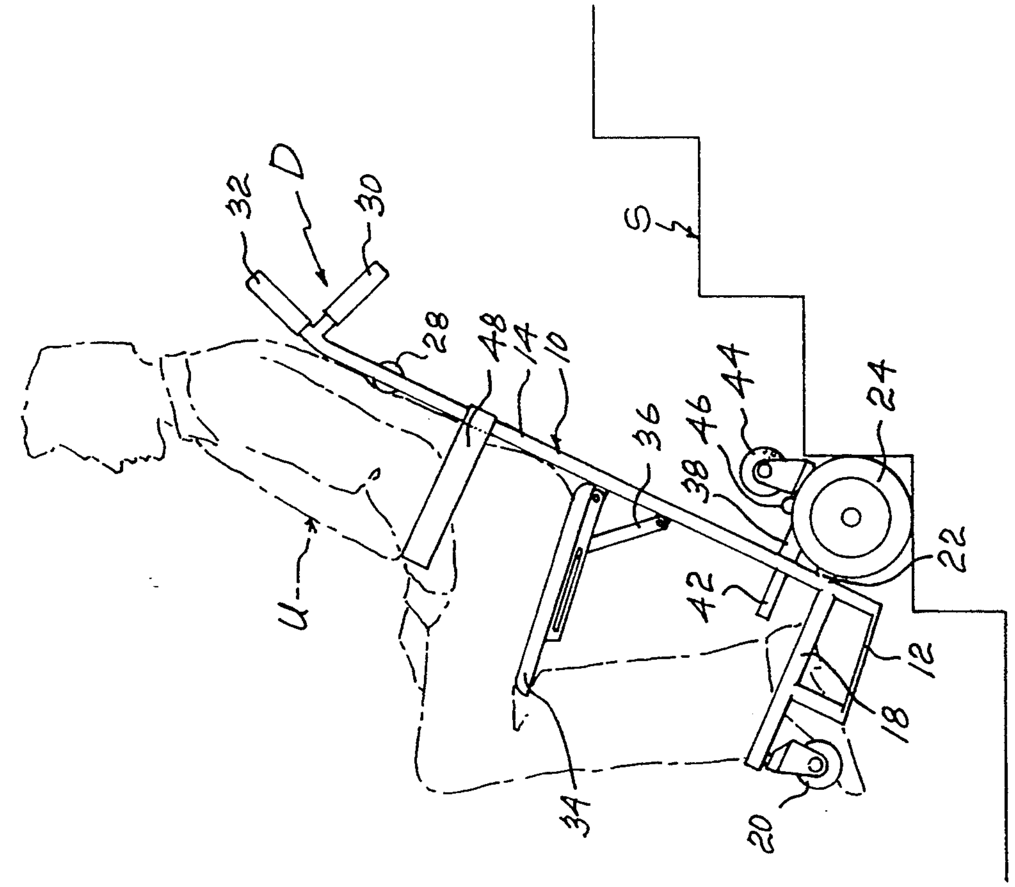
FIG. 7 is a side elevational view of the wheelchair of FIG. 3 being used to displace the user by an attendant on a staircase with the user being shown in phantom lines.

The front stabilizing member 26 comprises a sleeve 38 fixedly secured at its rear end to the L-shaped platform 12 with reinforcement links 40 extending from a front end of the sleeve 38 towards the front arms 22. A retractable strut 42 which acts as an extension to the sleeve 38 is telescopically connected thereto with a front caster 44 being mounted at a free end of the retractable strut 42. As an alternative, the retractable strut 42 could be pivotally connected to the sleeve 38. Furthermore, there could also be provided two parallel sleeves 38 each including a retractable strut 42 and a front caster 44. A cotter pin 46 is used for positioning the retractable strut 42 in an extended or retracted position with respect to the sleeve 38. Clamps or wing nuts could also be used to secure the front stabilizing member 26 to the vertical members 14. When the retractable strut 42 and the front caster 44 are retracted in the sleeve 38, the retractable strut 42 can be rotated 180° within the sleeve 38 so that the front caster 44 extends upwards with the cotter pin maintaining the front caster 44 in such a position, as seen in FIG. 7, for providing clearance to the wheels 24 when the mobility device D is used as a wheelchair being displaced, for instance, along a flight of stairs S. The retractable strut 42 can also be retracted in the sleeve 38 to reduce the size of the device D for storage or transportation purposes.

It is noted that the terms "rear" and "front" used in the above expressions "rear caster carrying members 18", "rear casters 20", "front arms 22", "front stabilizing member 26" and "front caster 44" are relative to the direction of displacement of the mobility device D when it is used as a walker. Obviously, when the mobility device D is used as a wheelchair, the terms "rear" and "front" do not apply to the direction of displacement of the mobility device D.

Figure 2:
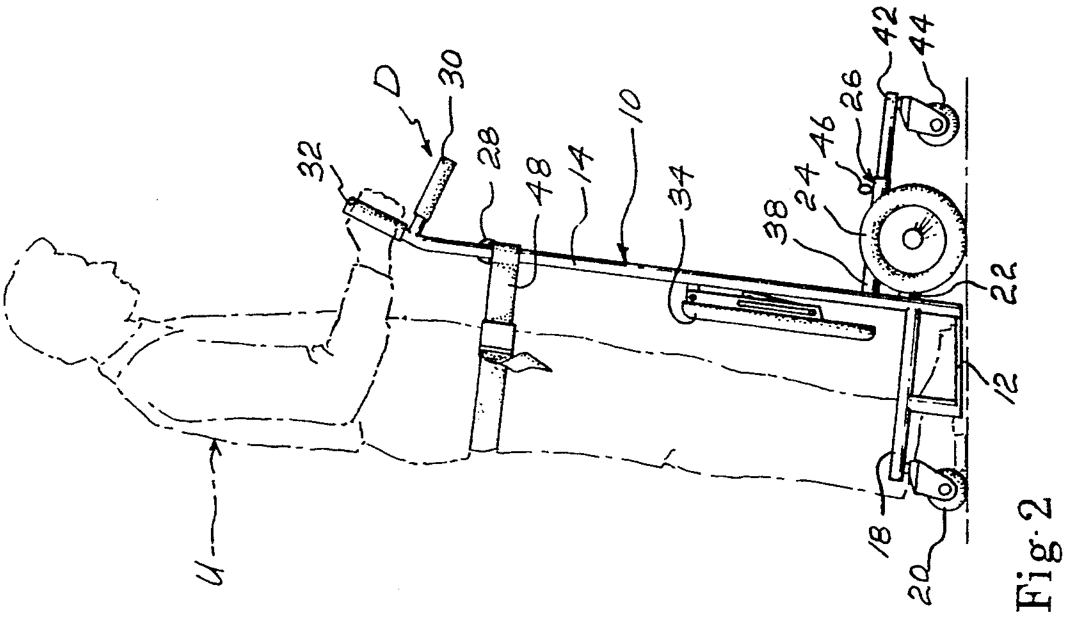
FIG. 2 is a side elevational view of the mobility aid of FIG. 1, shown in use as a walker, with a user appearing in phantom lines.

With reference to FIG. 6, the vertical members 14 are each comprised of a pair of longitudinally aligned and pivotally connected sections 14*a* and 14*b* with the lower section 14*b* being pivotally connected to the platform 12 in order that the mobility device D can be collapsed a storage position. It is also contemplated to telescopically connect the sections 14*a* and 14*b* of the two vertical members 14, instead of using pivotal connections, to ensure the collapsibility of the mobility device D. The adjustment within the telescopically connected members 14*a* and 14*b* will also allow human dimensional variations adaptability by providing flexibility for height variation of the users As seen in FIGS. 2, 3 and 7, a waist belt 48 is provided for safely securing the user U to the mobility device D both in its walker and wheelchair modes. As seen in FIGS. 3 and 7, when the mobility device D is used as a wheelchair, the back of the user U rests against the padded member 28. With reference to FIG. 2, when the mobility device D is used as a walker, the padded member 28 will act as a front torso support to the user U and, when the user U rocks the mobility device for propulsion purposes as will be explained in details hereinafter, the padded member 28 will act as a cushion on the torso of the user U. The padded member 28 will also serve as a backrest for the user U when the device D is used as a wheelchair, as seen in FIGS. 3 and 7.

Regarding the structure of the present mobility device D, it is finally contemplated to have the rear casters 20 at least partly retractable with respect to the rear caster carrying members 18 in order to reduce the size of the device D when it is in its collapsed storage position.

A storage compartment, such as a bag, can be removably mounted to the frame 10 of the mobility device D and, more particularly, on the vertical members 14 thereof between the reinforcing padded member 28 and the seat support 16.

In use as a wheelchair, the mobility device D operates substantially identically as a standard wheelchair, as well seen in FIGS. 3 and 7. To receive the feet of the user in the wheelchair position, the size of the platform 12 can be increased. It is contemplated to modify the platform 12 in order that it can take any one of two positions, that is a standard position as shown, for example, in FIGS. 1 and 2 and an extended position for receiving the feet of the user U when the mobility device D is used as a wheelchair. For instance, the platform 12 could be made of a pair of foldable sections which, when unfolded, constitute an extended platform for wheelchair purposes and which, when folded, resembles the platform 12 illustrated, for instance, in FIG. 1 and adapted for receiving the user U in the walker mode. Furthermore, the platform 12 could be displaceable towards the rear casters 20 and secured thereto and to the carrying members 18 in order that it may be used as a footrest for the user U when he is sitting on the padded seat 34.

When the mobility device D is used as a wheelchair, the rear casters 20 and the wheels 24 are in contact with the ground with a clearance being provided between the platform 12 and the ground, as seen in FIG. 3. The user U is in a sitting position on a padded seat 34 and is secured to the frame 10 by way of the belt 48. The feet of the user U can rest on the platform 12, as shown in FIG. 7, or on a platform (not shown) which has been extended towards the rear casters 20 as described hereinabove for providing the required footrest. The retractable strut 42 and the front caster 44 can be retracted in the sleeve 38, as seen in FIG. 7, with the front caster 44 being reversed and thus extending upwards to provide clearance at the rear of the wheelchair, for instance, for when the wheelchair is displaced along the flight of stairs S and also for preventing the retractable strut 42 and the front caster 44 from standing in the way of an attendant pushing the wheelchair by standing behind the user U and the frame 10 of the mobility device D while operating the first set of grips 30.

FIGS. 1, 2, 4 and 5 illustrate the present mobility device D in use as a walker. Accordingly, the user U stands on the platform 12, as seen in FIG. 2, with the padded seat 34 being in its collapsed position. The belt 48 is again used to secure the user U to the frame 10 of the mobility device D while allowing some room for the user U to pivot relative to the frame 10. The user U grasps the second set of grips 32, whereby, before being displaced by the user U, the mobility device D is in the position shown in FIG. 2 with the rear casters 20 and the wheels 24 contacting the ground as in the wheelchair mode. The retractable strut 42 and the front caster 44 are in their extended position.

Basically, by pushing on the upper part of the frame 10 using preferably a forward rocking motion of the user U on the second set of grips 32 or by exerting a thrust directly with the user's body or torso on the frame 10 and, more particularly, on the reinforcing padded member 28, the mobility device D will pivot slightly forwards about the wheels 24 with the rear casters 20 leaving the ground. If the force exerted by the user U is sufficient, the mobility device D and the user U will displace forwards on the wheels 24. For safety reasons, the forward tilting of the mobility device D is limited by the front caster 44. Again, a forward push from the user U causes the slight pivot of the frame 10 which thus displaces on the wheels 24 along with the user U. Accordingly, for each thrust or force exerted by the user U, the mobility device D and the user U standing thereon will displace a short distance which is dependent on the force itself as it is translated in a moment acting on the wheels 24 against the moments exerted thereon by the weight of the mobility device D and the user U. Accordingly, a greater force will result in a greater rotation of the wheels 24 and thus a longer forward displacement of the mobility device D and the user U. Friction forces obviously also affect the resulting displacement of the device D and user U.

The user's displacement is ensured by various basic laws of nature. For instance, the Law of Moments is used to allow the user U to lift himself up with a very small effort either by leaning forward or by pushing himself against the second set of grips 32 of the mobility device D, thereby increasing the total potential energy of this man-machine system. When the moment on top is greater than the moment due to the weight of the user U about the contact point with the ground, the load carrying wheels 24 will rotate thus producing a horizontal displacement of the mobility device D and the user U carried thereby. The potential energy or the energy stored in the system due to the flexing of the structure is converted with virtually no loss into kinetic energy simply by shifting the center of gravity over the fulcrum, which is in line with the load carrying wheels 24. The only energy lost is the result of friction. This shift over the center of gravity produces the revolution of the wheels 24, thereby moving the user forward. At the end of the revolution, the user U shifts the upper portion of his body rearwards and, after touching the ground with his heels again, the individual may repeat the cycle over again and thus gradually advance.

Basically, but in a simplified manner, in order that the mobility device D can be displaced forwards, the user U must exert a force on the second set of grips 32 which results in a moment with respect to the wheels 24 that is greater than the moment existing between the weight of the user U and of the device D with respect also to the wheels 24. The center of gravity (at which point the weights of the user U and of the device D are applied as a vertical force) of the device D and of the user U standing on the platform 12 thereof is located at a horizontal distance from the rotation center of the wheels 24 which is much smaller than the vertical distance between the second set of grips 32 (at which point a substantially horizontal force is applied by the user U) and the rotation center of the wheels 24. Therefore, the force which will be required by the user on the second set of grips 32 will be much smaller than the combined weights of the user U and of the device D in order to have offsetting moments which will result in the rear casters 20 leaving the ground and in the wheels 24 rotating with the mobility device D and the user U being accordingly displaced forwards. For instance, if the horizontal distance between the above-mentioned center of gravity and the rotation center of the wheels 24 is 10 inches, and the vertical distance between the second set of grips 32 and the rotation center of the wheels 24 is 50 inches, the user U will only have to produce a force applied to the grips 32 (or to the padded member 28 which is slightly above one fifth of the combined weight of the user U and the device D.

Figures 4, 5:
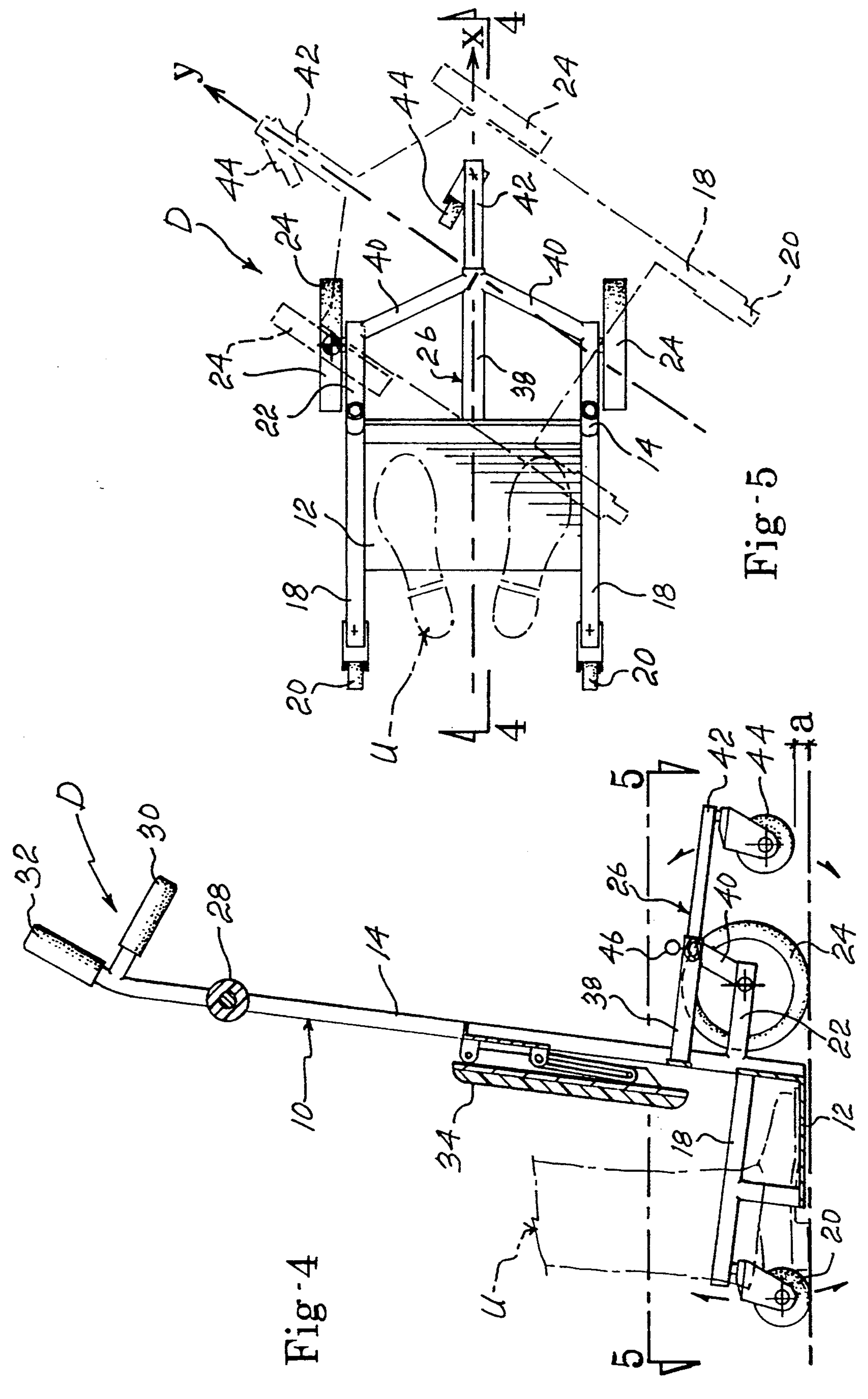
FIG. 4 is a cross-sectional side view taken along lines 4—4 of FIG. 5 and showing details of the walker shown in FIG. 2.
FIG. 5 is a cross-sectional top plan view taken along lines 5—5 of FIG. 4 and showing, in phantom lines, the walker being pivoted for turning the mobility aid.

With reference to FIG. 5, the mobility device D in use as a walker can be turned under the Law of Conservation of Angular Momentum which is applied to steer the device D. More particularly, all that is required to turn the mobility device D is for the user U to lean forward and to turn the upper part of his body in the required direction, whereby the mobility device D will turn about a pivot point corresponding to the point of contact of the ground with the wheel 24 towards which the device D is being steered.

When the user U feels tired and wants to rest, the retractable padded seat 34 can be pivoted to its functional position shown in FIG. 3. The seat 34 could also be set into the sitting position thereof by providing a retaining system which would require that the seat, in the vertical position thereof shown in FIG. 1, be first translated upwards before being pivoted downwardly towards a horizontal position. Pins could be used to secure such a seat in the two positions thereof with stoppers being provided to prevent any further pivot of the seat past the horizontal position thereof. Therefore, the walker becomes basically a wheelchair that can be manipulated by an attendant. Unlike existing wheelchairs, an attendant alone or with assistance of another individual can lift the chair bound person along the flight of stairs S, as seen in FIG. 7, or along an escalator. This feature will finally allow disabled people to access public transportation services, like buses, planes, metro or trains. For safety purposes, the front stabilizing member 26 is again provided to prevent tipping forward of the mobility device D. At the same time, the two rear caster carrying members 18 and the two rear casters 20 mounted thereto are provided in the back of the device D for safety reasons during the walker motion and for stability during the wheelchair operating mode. Collapsible flip-down armrests could be pivotally mounted to the vertical members 14 for use when the device D is in the wheelchair position. The armrests could also, in the extended position thereof, limit the user's lateral motion when the device D is used as a walker.

It is also contemplated that a brake be provided as a parking device or also to block a selected one of the wheels 24 for pivoting the mobility device D and allow the user to steer the device about the contact point with the ground of the wheel 24 onto which the brake is applied. Brakes could also be provided on the rear casters 20 for use when the user U is going up a ramp and also while in the seated position when at rest for safety reasons.

It is further contemplated to have a seat (retractable or fixed) located vertically opposite the platform 12, that is above the platform 12, for receiving a user in a sitting position while facing forward, that is in the same direction as in FIG. 2. In such a case, the user would also exert a force on the frame 10, as in the above walker mode, to gradually advance.

Accordingly, the present mobility device D is characterized by being transportable and affordable, by being formed of a rigid frame construction, and by comprising high quality casters with rubber cushions, a soft retractable padded (or canvas stretched) seat, a belt, a bag, a carrying case and also possibly a retractable work table. It can also have provisions for attachment of interveneous liquid pouches if used in hospitals for patients. The present mobility device D can be used by hemiplegia patients, multiple sclerosis patients, geriatrics, paraplegics, spina bifida patients, Guillain-Barre syndrome patients, muscular dystrophy patients, poliomyelitis patients, rheumatism patients, and any other person having mobility disabilities. The present mobility device could also be used as a rehabilitation device for people who may have to regain improved mobility after operations, accidents, etc. It could also be used as recreational and training device. The present mobility device D can help to prevent bone decalcification and it can also stimulate blood circulation, assist in bladder training, and improve the functions of the digestive system, urinary system and intestinal functions. With the present mobility device D, pressure sores that occur due to a continuous sitting on a wheelchair are greatly reduced. The mobility device D is thus a rehabilitation device as well as a recreational vehicle.

I claim:

1. A mobility device for physically disabled people, comprising a body means including a support means located at a lower end thereof and adapted to receive a user, said body means including a substantially upwardly extending frame means and further including front, middle and rear wheel means, said middle wheel means supporting said body means on a support surface onto which said mobility device is intended to be displaced, said middle wheel means being located proximate said frame means and in front of a center of gravity of said mobility device and of the user carried thereby with the user being positioned on said support means and facing towards said frame means, said front and rear wheel means being located respectively in front of and behind said middle wheel means; wherein, in an at rest position with the user being positioned on said support means, said middle and rear wheel means contact the support surface with said front wheel means being spaced above the support surface, whereby, to operate said mobility device, a sufficient force is exerted by the user on said frame means substantially in a forward direction thereby producing a pivot of said body means substantially about said middle wheel means and a rotation of said middle wheel means thus resulting in a forward displacement of said mobility device and of the user carried thereby, said pivot of said body means being forwardly limited by said front wheel means engaging the support surface whereat said mobility device and the user carried thereby can displace on said front and middle wheel means with said rear wheel means being slightly spaced above the ground surface, wherein after a certain forward displacement said body means returns to a position where said body means is supported by said middle and rear wheel means, whereby the user can displace in translation by way of a substantially rocking reciprocating motion of said mobility device resulting from forces being periodically applied by the user on said frame means.

2. A mobility device as defined in claim 1, wherein said support means comprises a platform secured to said body means, and wherein said rear wheel means are mounted to said body means behind the user when positioned on said platform.

3. A mobility device as defined in claim 2, wherein a first distance between said middle wheel means and a point of application of said sufficient force by the user on said frame means is greater than a second distance between said middle wheel means and a center of gravity of said mobility device and the user supported thereby, whereby said sufficient force is approximately equal to a combined weight of said mobility device and the user times a ratio formed by said second distance on said first distance.

4. A mobility device as defined in claim 3, wherein said frame means extends substantially upwards from a front end of said platform, said frame means including grip means at an upper end thereof adapted to be grasped by the user, wherein the user can exert said sufficient force on said frame means by pushing said grip means or by leaning against said frame means.

5. A mobility device as defined in claim 4, wherein said frame means extends upwards and forwards at a small angle from the vertical and comprises a pair of parallel substantially vertical members and at least one cross-member extending therebetween.

6. A mobility device as defined in claim 4, wherein said frame means comprises a pair of parallel substantially vertical members and at least one cross-member extending therebetween, said at least one cross-member being disposed substantially opposite a torso of the user, whereby the user can lean against said cross-member for exerting said sufficient force on said mobility device.

7. A mobility device as defined in claim 6, wherein padding means is provided on said cross-member.

8. A mobility device as defined in claim 6, wherein a further cross-member is provided between said vertical members with a retractable seat being mounted thereto, said seat being displaceable between a first collapsed storage position wherein said seat extends closely along said frame means and rearwards thereof and a second extended operational position wherein said seat extends rearwards of said frame means in a substantially horizontal direction for receiving thereon the user in a sitting position.

9. A mobility device as defined in claim 8, wherein handle means provided on said frame means are adapted to be grasped by a person standing in front of said frame means but facing rearwardly towards said frame means for operating said mobility device as a wheelchair with the user being in said sitting position on said seat while facing rearwards of said mobility device, said seat being in said extended position thereof and the user being able to rest his feet on said platform.

10. A mobility device as defined in claim 4, wherein said frame means is provided with a belt means for securing the user thereto while allowing the user to rock his body for displacing said mobility device.

11. A mobility device as defined in claim 4, wherein said frame means comprises collapsible sections for reducing a vertical size of said mobility device for storage purposes.

12. A mobility device as defined in claim 2, wherein said middle wheel means comprises a pair of wheels rotatably mounted at the lower sides of said body means and just in front of said frame means, said rear wheel means comprising a pair of rear casters mounted on swivels rearwards of said platform.

13. A mobility device as defined in claim 1, wherein said body means comprises a front stabilizing member extending forward from said body means with said front wheel means being rotatably mounted at a front free end of said stabilizing member.

14. A mobility device as defined in claim 13, wherein said front wheel means comprises a front caster mounted on a swivel at said free end.

15. A mobility device as defined in claim 13, wherein said stabilizing member comprises a rear sleeve mounted to said body means and extending forwards therefrom and a front strut retractable in said sleeve and extending forwards therefrom, said front wheel means being mounted at a free end of said strut, whereby said strut and said front wheel means are displaceable between a retracted storage position and an extended operational position.

16. A mobility device as defined in claim 15, wherein said front wheel means is adapted to be inverted so as to extend upwards from said free end in said storage position, wherein said strut and said front wheel means are located at least partly inwards of a forward most edge of said middle wheel means.

* * * * *